Patented Mar. 3, 1936

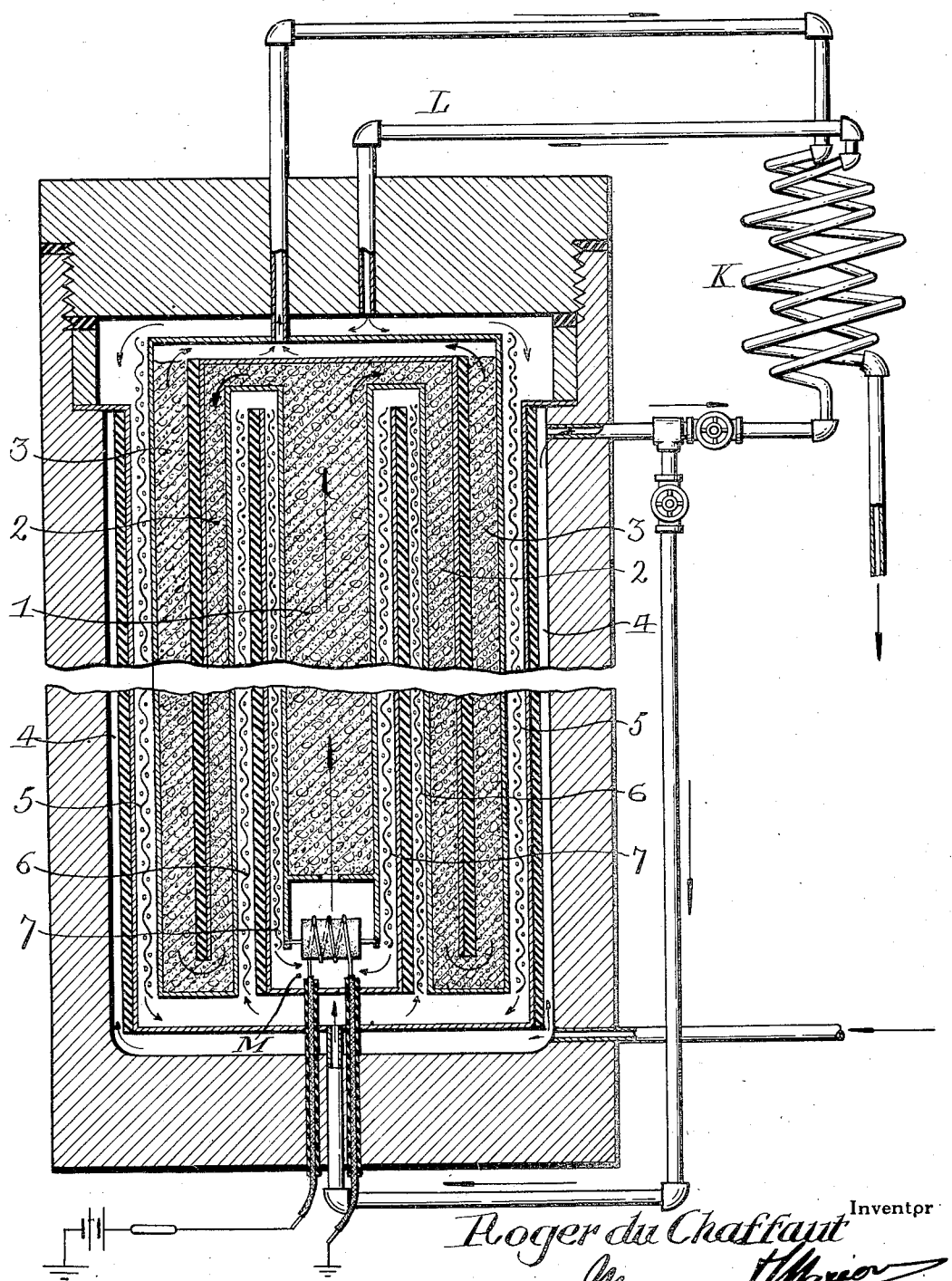

2,032,652

UNITED STATES PATENT OFFICE 2,032,652

PROCESS AND APPARATUS FOR CARRYING OUT CHEMICAL REACTIONS, IN PARTICULAR CATALYTIC REACTIONS

Roger du Chaffaut, Douai, France, assignor to l'Air Liquide, Societe Anonyme pour l'Etude & l'Exploitation des Procedes Georges Claude, Paris, France Application June 16, 1931, Serial No. 544,906
In Germany June 19, 1930

13 Claims. (Cl. 23—289)

In the industrial production of reactions between fluids in contact with solid materials, in particular in contact with catalyzers, it is necessary to regulate in a suitable manner the temperature of the substances in the course of reaction.

The suitable regulation of the temperature is of particularly great importance when carrying out gaseous exothermic reactions effected in the presence of catalyzers. In these reactions, care must be taken not to overheat the catalyzer in order to avoid rapid destruction of its catalytic activity and in order not to prejudicially influence the yield of the reaction, this latter, conditioned by the equilibrium constant, decreasing when the temperatures rises.

In the case of exothermic reactions under pressure, another difficulty is met with: It is necessary to protect, as much as possible, the exterior wall resisting the pressure against the effect of the heat released by the reaction, in order to preserve for the apparatus all the solidity desirable.

In order to prevent an excessive rise in the temperature of the catalyzer, it has been proposed to cause the gases, before reacting, or other gases, to circulate around the catalyzer, which protects at the same time, to a certain extent, the outer wall offering a resistance to the pressure. If the diameter of the tube is considerable, however, these means are insufficient. It has been proposed, then, to make the gases in question circulate in parallel currents in tubes traversing the mass of the catalyzer. This process, however, does not permit of effectively protecting the external wall without special devices. Finally, it has been proposed to make the temperature regular and uniform by arranging screens inside the catalyzer, but this method is not always sufficiently effective, for a great quantity of the heat is released initially from the catalyzing material.

According to the present invention, the above-mentioned drawbacks are diminished and even avoided by causing the circulation of the fluids before reaction and the fluids in the course of reaction in indirect contact and in counter-current during the whole of the duration of a sinuous course imparted to the fluids in the course of reaction by screens disposed for this purpose. It is possible, under these conditions, to reach indirectly by the gases before reaction the various regions of the mass of the catalyzer, and, through this medium, to regulate the temperatures prevailing there, whilst at the same time interposing the coolest regions of the catalyzer between the hottest regions of the catalyzer and the external wall offering resistance to the pressure, so that this latter may be effectively protected. There is no obstacle, moreover, to augmenting this protection by the additional interposition of a gaseous layer forming a screen.

The accompanying drawing shows diagrammatically, by way of non-restrictive example, a device for realizing the present invention, applied to an exothermic catalytic reaction under pressure, such as the synthesis of ammonia.

The catalyzing chamber is constituted by a cylindrical part 1, enclosed by two concentric annular parts 2 and 3. These three regions are separated from each other by annular screens, that separating the zones 1 and 2 being traversed by the gases before reaction, intersected by two currents of contrary directions, each of a direction opposed to the gaseous current circulating in the catalyzer, by means of an interior screen, preferably of a material which is a poor conductor of heat. The screen separating the zones 2 and 3 is itself also preferably of insulating material.

The circulation of the gases is as follows: The fresh gases circulate first of all in an annular zone 4, thermically insulated as much as possible from the catalyzing chamber, and protect the exterior wall. Upon leaving, they are divided into two parts: One of them passes first of all into an exchanger K, in indirect contact with the gases leaving the apparatus, and thence into the annular zone 5. The other part enters directly into the apparatus and mixes with the gases having just traversed the zone 5. The mixture then traverses the zones 6 and 7, then meets at M an electric heating resistance serving for the starting of the reaction. The gases penetrate next into the mass of the catalyzer, traversing the zone 1, then the zones 2 and 3, before leaving the reaction chamber.

The regulation of the temperature takes place, in the course of operation, by modifying the respective supplies of the two gas entrances.

The annular spaces 5, 6 and 7 may be provided with metallic cloth, which improves the exchanges and increases the solidity of the whole.

It is possible also, for example for improving the heat exchanges by augmentation of the contact surface, to replace certain of the annular zones by sets of parallel tubes, on condition, of course, that the gases are made to circulate therein in the same manner.

It will be seen that all expansions are free in such a device.

It will also be seen that the region 1, which is the hottest, is separated from the wall resisting the pressure by the catalyzer layers 2 and 3, and by the gaseous layers 4, 5, 6 and 7. The protection of the exterior wall against heat is therefore effective. The circulation in counter-current is, moreover, rigorously observed at all points of the apparatus, which is absolutely rational from the thermic point of view. Finally, although the catalyzer is spread out in a thin layer, the apparatus is compact and not very cumbersome considering the length of the path of the gases.

By means of an apparatus of this kind, it is easily possible to realize, not only very exothermic synthesis like that of ammonia, but also slightly exothermic reactions like the hydrogenation of CO and of $O_2$ in small quantities in gases intended for the synthesis of ammonia. With a similar apparatus, endothermic reactions may also be effected with the same facility as regards the regulation of the temperature.

What I claim is:

1. The process of carrying out chemical reactions between fluids in contact with solid materials, which comprises circulating a current of the fluids which are to react and a current of the fluids in the course of reaction in indirect contact with and in counter current to each other respectively along two sinuous paths, each path consisting of a succession of sections in which the current of fluids circulating along said path alternately flows in one direction and in the opposite direction, two successive sections of the path of the fluids about to react being spatially contiguous to each other.

2. The process of carrying out chemical reactions between fluids in contact with solid materials which comprises circulating a current of the fluids which are to react and a current of the uninterruptedly reacting fluids in indirect contact with and in counter current to each other respectively along two sinuous paths, each path consisting of a succession of sections in which the current of fluids circulating along said path alternately flows in one direction and in the opposite direction, two successive sections of the path of the uninterruptedly reacting fluids being spatially contiguous to each other.

3. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of sections in which the current of fluids circulating along said path alternately flows in one direction and in the opposite direction, every second section of the path of the fluids about to react being spatially contiguous to the preceding section of the same path.

4. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of sections in which the current of fluids circulating along said path alternately flows in one direction and in the opposite direction, every second section of the path of the fluids in the course of the reaction being spatially adjacent to the preceding section of the same path.

5. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of sections in which the current of fluids circulating along said path alternately flows in one direction and in the opposite direction, every second section of the path of the fluids about to react being spatially contiguous to the preceding section of the path of the fluids and every second section of the path of the fluids in the course of reaction being spatially contiguous to the preceding section of the same path.

6. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of annular sections concentric to one another in which the current of fluids circulating along said path alternately flows in one direction and in the opposite direction, every second section of the path of the fluids about to react being spatially contiguous to the preceding second section of the same path and every section of the fluids in the course of reaction being spatially contiguous to the preceding section of the same path.

7. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of annular sections concentric to one another in which the current of fluids circulating along said path alternately flows in one direction and in the opposite direction, every second section of the path of the fluids about to react being spatially contiguous to the preceding section of the same path and every second section of the fluids in the course of reaction being spatially contiguous to the preceding section of the same path, the fluids which are to react circulating from the most external to the most internal section of their path and the gases in the course of reaction from the most internal to the most external section of their path.

8. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of sections in which the current of fluids circulating along said path alternately flows in one direction and in the opposite direction, two successive sections of the path of the fluids about to react being spatially adjacent to but thermally isolated from each other.

9. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of sections in which the current of fluids circulating along said path alternately flows in one dirtction and in the opposite direction, two successive sections of the path of the fluids in the course of reaction being spatially adjacent to but thermally isolated from each other.

10. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of annular sections concentric to one another in which the current of fluids circulating along said path alternately flows in one direction and in the opposite direction, every second section of the path of the fluids about to react being spatially contiguous to the preceding section of the same path and every second section of the fluids in the course of reaction being spatially contiguous to the preceding section of the same path, the fluids which are to react circulating from the most external to the most internal section of their path and the gases in the course of reaction from the most internal to the most external section of their path, a part only of the fluids about to react circulating in the first sections of the path of said fluids and the whole of said fluids circulating in the remaining sections.

11. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of annular sections concentric to one another in which the current of fluids circulating along said path flows parallelly to the common axis of the annular sections alternately in one direction and in the opposite direction, every second section of the path of the fluids about to react being spatially contiguous to the preceding section of the same path and every second section of the fluids in the course of reaction being spatially contiguous to the preceding section of the same path.

12. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of annular sections concentric to one another in which the current of fluids circulating along said path flows parallelly to the common axis of the annular sections alternately in one direction and in the opposite direction, every second section of the path of the fluids about to react being spatially contiguous to the preceding section of the same path and every second section of the fluids in the course of reaction being spatially contiguous to the preceding section of the same path, the fluids which are to react circulating from the most external to the most internal section of their path and the gases in the course of reaction from the most internal to the most external section of their path.

13. The process of carrying out chemical reactions between fluids in contact with solid materials which comprises circulating a current of the fluids which are to react and a current of the fluids in the course of reaction in indirect contact with and in counter current to each other respectively along two sinuous paths, each path consisting of a succession of annular sections concentric to one another in which the current of fluids circulating along said path flows parallelly to the common axis of the annular sections alternately in one direction and in the opposite direction, every second section of the path of the fluids about to react being spatially contiguous to the preceding section of the same path and every section of the fluids in the course of reaction being spatially contiguous to the preceding section of the same path, the fluids which are to react circulating from the most external to the most internal section of their path and the gases in the course of reaction from the most internal to the most external section of their path, a part only of the fluids about to react circulating in the first sections of the path of said fluids and the whole of said fluids circulating in the remaining sections.

ROGER DU CHAFFAUT.